United States Patent [19]

Marrero

[11] 3,928,716
[45] Dec. 23, 1975

[54] ELECTRICAL OUTLET BOX ASSEMBLY

[76] Inventor: Louis Marrero, 13004 Via Del Valedor, San Diego, Calif. 92129

[22] Filed: Dec. 13, 1973

[21] Appl. No.: 424,437

[52] U.S. Cl. ................. 174/57; 174/58; 220/3.4; 339/40
[51] Int. Cl.² ................................ H02G 3/12
[58] Field of Search ............ 174/53, 55, 56, 57, 58; 220/3.4, 3.7, 3.9, 3.92; 339/36, 40, 122 R, 125 R, 126 R

[56] References Cited
UNITED STATES PATENTS

| | | | |
|---|---|---|---|
| 2,233,548 | 3/1941 | Mroziak | 174/58 UX |
| 2,374,622 | 4/1945 | Rugg | 174/58 |
| 2,477,803 | 8/1949 | Huber | 339/40 |
| 2,644,600 | 7/1953 | Senif | 220/3.9 |
| 2,788,151 | 4/1957 | Shore | 220/3.4 |
| 2,826,325 | 3/1958 | Johanson | 220/3.7 |
| 3,222,631 | 12/1965 | Cohen | 339/40 |
| 3,609,647 | 9/1971 | Castellano | 339/122 R |

*Primary Examiner*—J. V. Truhe
*Assistant Examiner*—David A. Tone
*Attorney, Agent, or Firm*—Ralph S. Branscomb

[57] ABSTRACT

A conveniently installed electrical outlet box having a mounting bracket which is mountable on the studding of a building and a separate wiring box having substantially conventional forward-facing outlet openings and terminals at the rear for power wires. The wiring box is slideably receivable on a track-and-rail system into the mounting bracket so that the assembly can be mounted on a stud prior to the installation of wallboard; and, after an access opening is cut in the installed wallboard, the wiring box can be slid out into the opening until the front face is flush with the front surface of the wallboard, and then locked at that position. A special face plate is provided which can be displaced after mounting to seal off the outlet openings when not in use.

10 Claims, 9 Drawing Figures

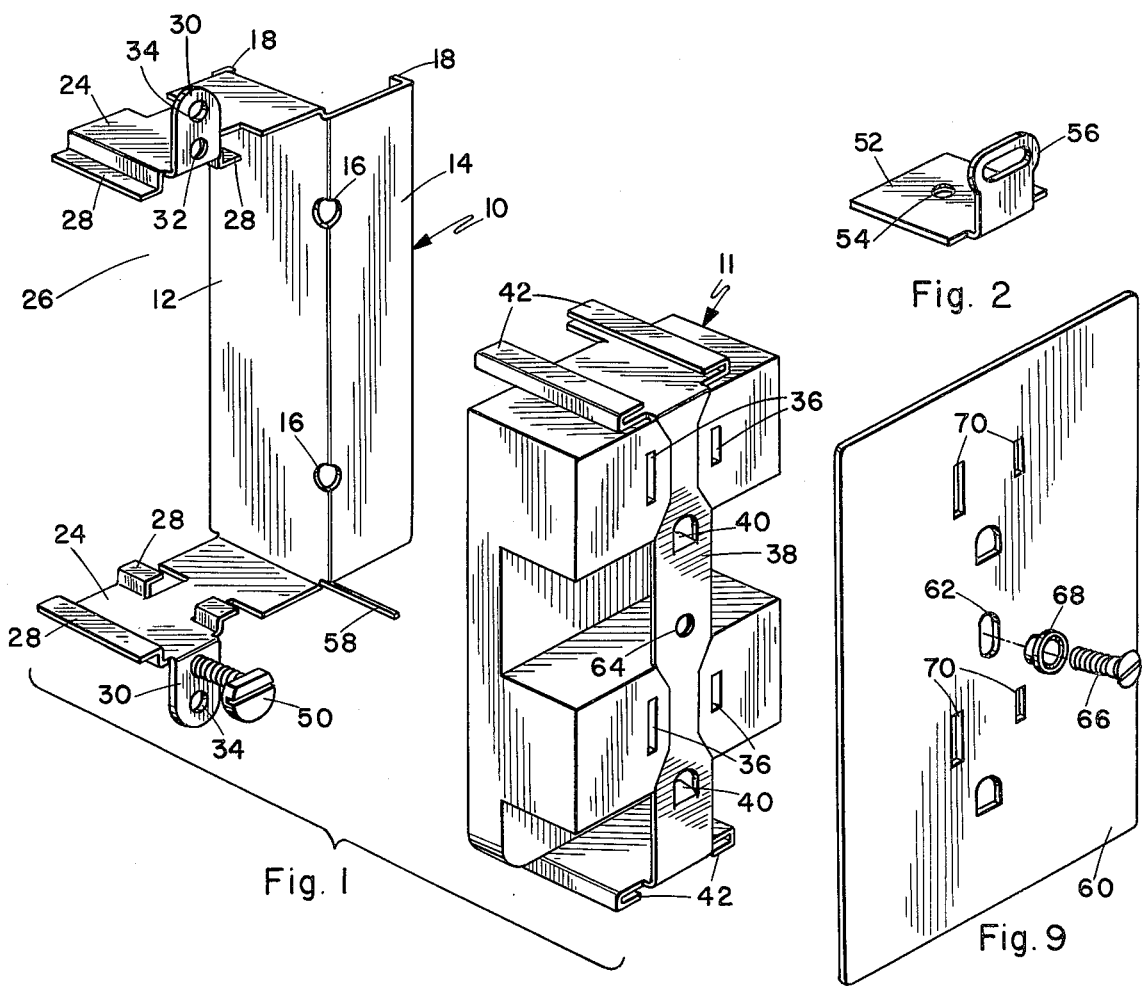
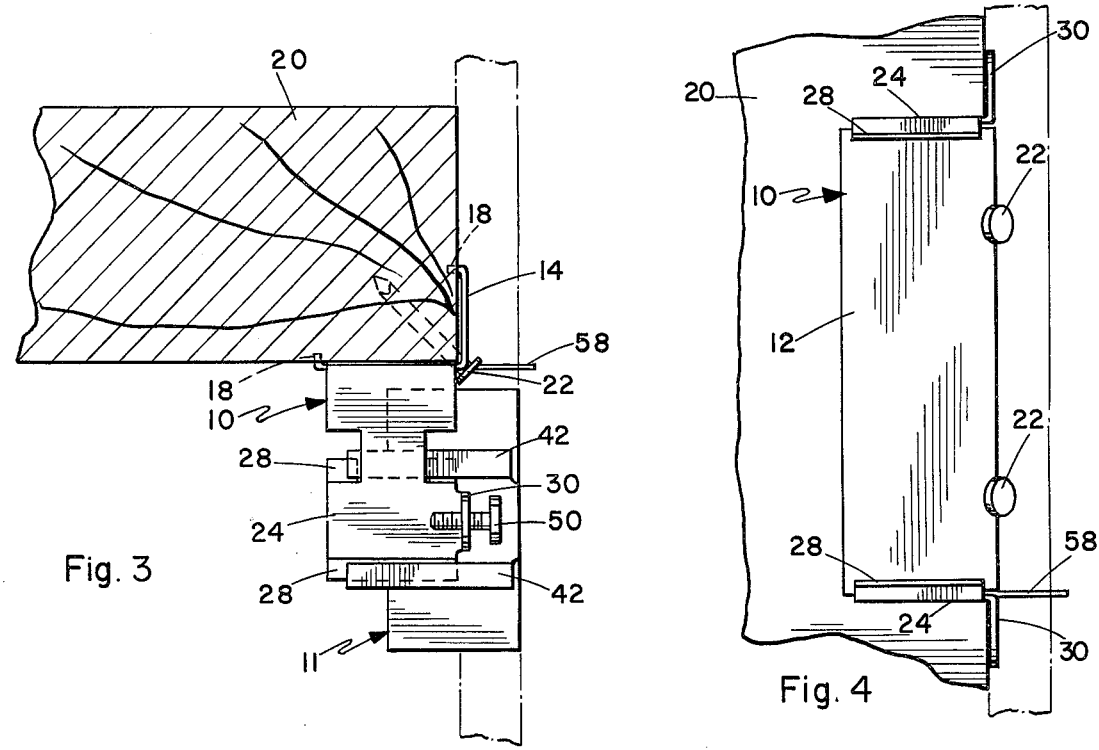

ELECTRICAL OUTLET BOX ASSEMBLY

BACKGROUND OF THE INVENTION

The invention relates to quickly installed electrical outlet boxes and is an improvement over my co-pending application Ser. No. 359,982. Both inventions provide an outlet box designed to considerably reduce the labor involved in installation, and in keeping with that goal, the boxes can be adjusted flush with the exposed surface of wallboard subsequent to the installation of both the utility box and wallboard so that the accuracy of the initial positioning of the utility box on the stud is of little consequence.

The prior invention also included a novel quick-connector means for connecting the outlet box to power wires, and additionally made provision for quick conversion of the outlet box assembly into a toggle switch receptacle. That unit is thus very versatile in addition to being quickly installed, but is structurally slightly complex for mass production and suggests the need for a simplified version which is more economically manufactured, but retains the labor-saving features of the prior invention.

SUMMARY OF THE INVENTION

The present invention is a simplified, quickly installed, outlet box comprising basically a mounting bracket and an outlet or wiring box which is slideably receivable in the bracket on a track-and-rail system. The bracket has an L-shaped support which is nailed onto the orthogonal edge of a stud, and a forwardly projecting spine which penetrates through subsequently installed wallboard to indicate to the workmen where on the wallboard the access opening should be cut. After the opening is cut, the wiring box can be slid out of the mounting bracket on the track-and-rail system and secured in place flush with the wallboard by turning a pair of eccentric-headed screws which frictionally engage the box. Adapters are provided for adapting both wiring box and mounting bracket to fit with their conventional counterparts, and the rear of the wiring box is provided with conventional quick-connector electrical contacts to accommodate power wires. A sliding face plate is also provided to enable the outlet openings to be covered when not in use.

BRIEF DESCRIPTION OF THE DRAWINGS

FIG. 1 is a perspective view of the mounting bracket and outlet units separated;

FIG. 2 is a perspective view of an adapter slide for optional use with the outlet;

FIG. 3 is a top plan view of the assembled units attached to a support;

FIG. 4 is a side elevation view of the bracket attached to a support;

FIG. 9 is a perspective view of a slideable face plate for the outlet.

DETAILED DESCRIPTION OF THE PREFERRED EMBODIMENT

Figure 5:
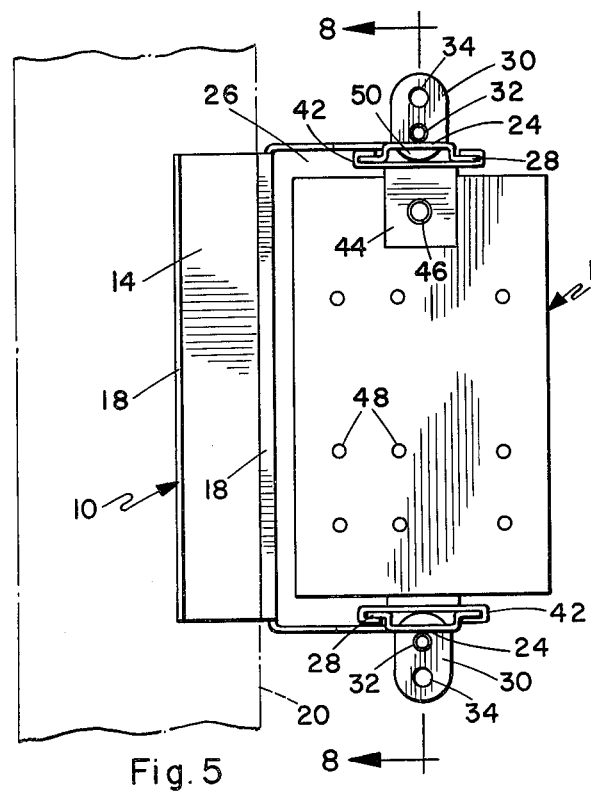
FIG. 5 is a rear elevation view of the assembly of FIG. 3.
Figure 6:
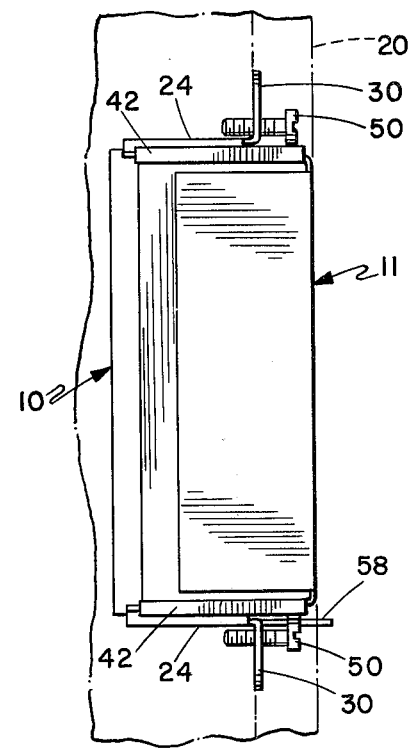
FIG. 6 is a side elevation view as taken from the right hand side of FIG. 5.
Figure 7:
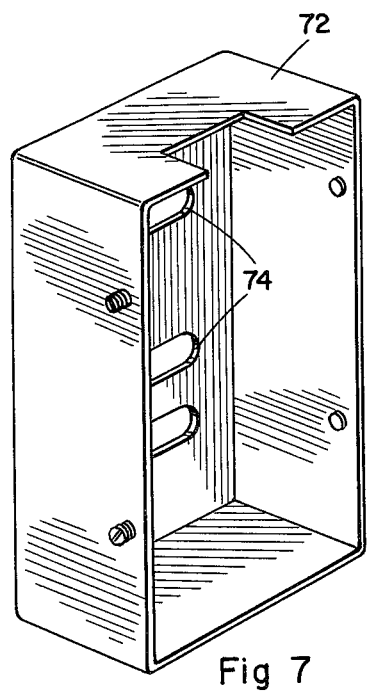
FIG. 7 is a perspective view of a protective cover for the outlet.

The principal components of the outlet assembly are a mounting bracket 10 and a wiring box 11, illustrated best in FIG. 1. The mounting bracket is most economically stamped from a single sheet of metal stock and bent to the prescribed form. Part of the bracket forms an L-shaped support comprised of two integral plates 12 and 14 orthogonally related and having a pair of punched-out nail holes 16 at their junction. The distal edges of the plates are inwardly turned to define jaws 18 which, when the bracket is placed on the vertical edge of a stud 20, as shown best in FIG. 3, grip the stud as nails 22 are driven therein to mount the bracket. The location of the nail holes 16 enables the nails 22 to be driven into the stud at an angle which will sink both jaws 18 simultaneously into the stud timber.

The positioning of the nail holes at the junction of plates 12, 14 also enables the installation of the assembly subsequent to the completion of the building and installation of the wallboard. This is accomplished without requiring access to the wallboard from the rear by cutting the appropriate hole in the wallboard adjacent the stud, slipping the mounting bracket into place with the plate 14 sandwiched between the stud and the wallboard, and driving the nails. The nails enter the stud at an angle such that they may be conveniently driven from within the room through the opening in the wallboard.

The mounting bracket is provided with any suitable means to slideably receive the wiring box. In the preferred embodiment, the bracket has two horizontal members 24 which are preferably the vertical mirror images of one another and which, together with the plate 12, define a channel 26 that is enclosed on three sides and receives the wiring box 11, as subsequently described. Portions of the horizontal members 24 are bent into shoulders defining rails 28 which project laterally in the channel. Tabs 30 are also provided, projecting away from the channel, essentially normally from the front edges of the horizontal members and are each threadably bored at 32 and 34 for purposes to be made clear hereinafter.

The wiring box 11, preferably fabricated of plastic, is similar to an ordinary wiring box in that it has the usual outlet openings 36 disposed in the forward face thereof defining an upper and lower electrical receptacle. In addition, a metal strap 38 is provided which, in its frontal portions, seats in a recess formed in the wiring box for that purpose and has rearwardly-struck tongues 40 which serve as the grounding contacts for inserted ground prongs, not shown. The ends of the strap are bent into horizontal portions having lateral flanges that are counter-bent into opposing tracks 42 which complement the rails 28 of the mounting bracket to enable the wiring box to be slideably received therein, as can be clearly visualized from FIG. 1. The upper end portion of the strap 38, between the upper set of tracks, is downbent at 44, illustrated in FIGS. 5 and 8, to serve the dual purpose of clamping the strap to the wiring box and providing a screw terminal, shown at 46 (without the screw), for a ground wire.

The rear of the wiring box is provided with openings 48 to accommodate wires 76, which may be power wires, or wires leading to subsequent outlets, or wires leading to switches in the case of switch-controlled outlets. Terminals for the wires reside behind the openings 48. The wiring within the wiring box and the particular terminal used may be of any conventional type and are not material to the invention, although the screwless press-in type power terminals are preferred.

After the wiring box has been wired and slid into the mounting bracket as described, it is locked into the desired position by means of the screws 50 which are engaged in the holes 32. The heads of the screws each have a flat ground on one edge so that the wiring box is permitted entry into the mounting bracket when the flat sides are properly aligned, and a subsequent turn will cause the screw heads to frictionally bind against the wiring box and secure it against dislodgement. A cam-headed screw or other quickly engageable locking means could be used within the parameter of the invention. Portions of the wiring box engaged by the screw heads may be burred or scored to increase the holding power of the screw heads.

The screwholes 34, disposed in the tabs 30, are positioned to align with the screw holes of a standard wiring box, not shown, and permit the mounting bracket to be used with such a conventional box should it be found desireable.

Similarly, two slides 52 are provided, only one being shown, each having a set screw hole 54 and a slotted upstanding tab 56. These slides may be inserted and secured in the tracks 42 to adapt the wiring box to fit a conventional mounting bracket should the specialized form provided by this invention be unavailable or for some reason not useable.

A spine 58, which is preferably unitary with the mounting bracket, projects forwardly therefrom and is used to locate the assembly after it has been mounted and wallboard has been installed over the front. The spine is rigid enough to penetrate the wallboard, thus indicating to a workman precisely the location of the assembly so that an access hole may be cut through the wallboard in the proper place without being unnecessarily over-sized. The spine is preferably weakened near its junction with the mounting bracket so that it may be snapped off subsequent to the cutting of the access hole.

Figure 8:
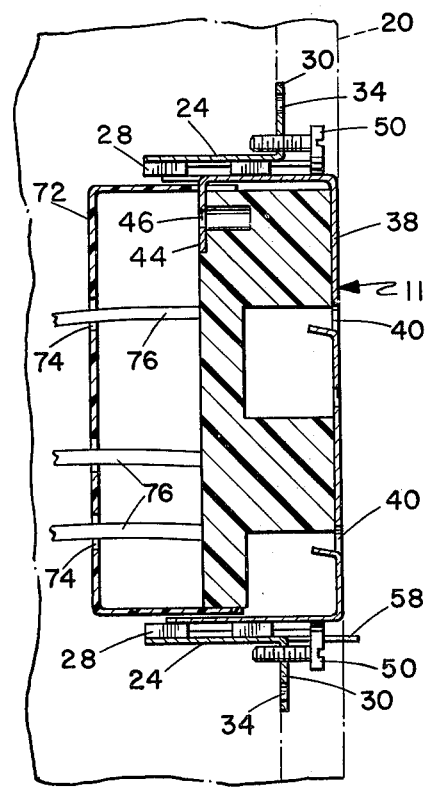
FIG. 8 is a sectional view taken on line 8—8 of FIG. 5, with the protective cover added.

After the access hole has been cut, the wiring box is pulled through until its front is flush with the interior surface of the wallboard, and the locking screws 50 are turned to firmly anchor the box in that position, illustrated in FIGS. 3 and 8. At this point the face plate 60 can be attached, to which end it is provided with a centrally located, oblong slot 62 corresponding to a screw hold 64 provided in a central portion of the strap 38. A screw 66 and shoulder bushing 68 join the face plate and wiring box together in sliding relationship in order that the access openings 70 in the face plate may be aligned or disaligned with the outlet openings so that the outlet may be made either functional or, when not in use, sealed off entirely for the safety of children.

It will be noted that the face plate does not have the two large receptacle holes typical of conventional models, but is provided only with holes sufficient to accommodate the prongs of an electrical plug. This feature enables the face plate to be provided in a set of different colored plates from which the user may select to blend with the interior decor of the room. The color or shape of the wiring box does not affect the finished appearance of the apparatus and need not be provided in a variety of colors when face plate 60 is used.

A rear protective cover 72 is provided with openings 74 to accept the wires 76. The cover marginally overlaps the rear of the wiring box and may have a lip at the forward edge to mate with a corresponding groove in the wiring box to form a snap-on, connection or, as illustrated, it may simply be provided with set screws.

The rear of the wiring box is preferably dimensioned similarly to a conventional box so that the cover 72 would fit either type. With this in mind, it is apparent that any of the major parts of the assembly, the mounting bracket, the wiring box, and the rear cover, may be used with or adapted for use with conventional outlet box assemblies, so that all of these parts are interchangeable with their presently marketed counterparts.

It should be noted that a toggle suited box could easily be designed with the track system incorporated in the wiring box, so that the mounting bracket would be functional to house either an outlet or a switch.

I claim:
1. An electrical outlet box assembly comprising:
   a. a mounting bracket element having a pair of substantially planar spaced parallel wall members joined at one edge by an orthogonal wall member, said members defining a channel;
   b. a wiring box element having a front face with outlet openings therein and terminal means connectable to a source of power;
   c. one of said elements having track means and the other of said elements having rail means slideably engaged with said track means such that said wiring box is slideably received in said channel; and
   d. said bracket element having a substantially L-shaped support fastenable to a substantially orthogonal edge of building stud.

2. Structure according to claim 1 including a plurality of parallel tracks mounted on said wiring box and a plurality of parallel rails mounted on said bracket and engaged with said tracks.

3. Structure according to claim 2 wherein said plurality of parallel tracks comprises pairs of opposed tracks on opposite sides of said wiring box and including two slides, each fixedly securable in one of said pairs of tracks and having an upstruck portion with an aperture therein to adapt said wiring box to a conventional outlet box bracket.

4. Structure according to claim 1 and including a means of securing said wiring box against sliding in said channel.

5. Structure according to claim 4 wherein said bracket includes a frontal portion defining an entryway to said channel, said frontal portion having a tab projecting externally of said channel and having a threaded hole therethrough substantially adjacent said channel;

said bracket also including a screw threadably engaged in said hole and having a substantially circular head with a segment removed therefrom to form a flat;
   said head being dimensioned to allow free passage of said wiring element into said channel when said screw is turned with the flat toward the channel, and frictionally engaging said wiring box when the screw is turned such that the flat is remote from the channel; and
   said tab and screw together defining said securing means.

6. Structure according to claim 5 wherein said tab is duplicated on substantially opposite sides of the frontal portion of said bracket and said screw is likewise duplicated, whereby a jaw-like gripping of said wiring box in said channel can be effected.

7. Structure according to claim 6 wherein each of said tabs has a second threaded hole more remote from said channel than the first-mentioned hole, whereby said bracket is adapted to engage a conventional screw-mounted wiring box.

8. Structure according to claim 1 wherein said substantially L-shaped support comprises two integral essentially mutually orthogonal plates having the distal edges thereof inwardly bent to define jaws to grip a stud to which said bracket is mounted.

9. Structure according to claim 8 wherein said L-shaped support has at least one mounting hole at the junction of said plates through which a fastener may be driven into a stud to which said bracket is mounted whereby a fastener may be driven through an opening cut in installed wallboard diaonally of said wallboard, and said jaws are caused to grip a stud simultaneously.

10. Structure according to claim 1 wherein said wiring box has a threaded hole in the front face thereof and including:
   a. a face plate having an elongated slot therein;
   b. a screw extended through said slot and engaged in said threaded hole to fasten said face plate to the wiring box;
   c. said face plate having access openings disposed therein in alignment with said outlet openings when said face plate is engaged by said screw at one portion of said slot, and being slideable on said screw to a position in which said access openings are misaligned with said outlet openings to prevent access to said outlet openings.

* * * * *